Oct. 11, 1966 R. F. RIGGS 3,278,934
ANTI-COLLISION PERSPECTIVE DISPLAY
Filed Dec. 11, 1964

INVENTOR.
ROBERT F. RIGGS
BY
Robert J. Haase
ATTORNEY

United States Patent Office 3,278,934
Patented Oct. 11, 1966

3,278,934
ANTI-COLLISION PERSPECTIVE DISPLAY
Robert F. Riggs, Charlottesville, Va., assignor to Sperry Rand Corporation, Great Neck, N.Y., a corporation of Delaware
Filed Dec. 11, 1964, Ser. No. 417,618
6 Claims. (Cl. 343—11)

The present invention generally relates to radar means for presenting target displays useful for avoiding collision and more particularly, to such means particularly adapted for use in target situations of the kind encountered by hydrofoil and helicopter craft.

As will be easily recognized, the manner in which radar target data is displayed to the operator-viewer is of primary importance to his full comprehension and exploitation of the target data. The same target data may be displayed in various alternative ways, each having its own advantages and disadvantages according to the usage contemplated. In the case of collision avoidance between two slowly moving surface craft, for example, ships, it has been found that the plan position indicator (PPI) provides an adequate display of target data. One of the important advantages of the standard PPI display is that if a target is following a straight line collision course, its motion is displayed along a tell-tale constant bearing line which is simple to discern. Another advantage is that non-collision straight line target courses also are displayed as straight lines whereby the anticipated point of intersection between the projected straight line courses of own ship and target ship may be quickly and easily determined by extrapolation of the displayed straight line target track.

One disadvantage of the standard PPI display, however, is that the display corresponds to a view of the target situation as would be seen from a vantage point high above own ship rather than as is actually seen from the position of the observer or navigator. The navigator's view of the target situation is one of perspective in which the targets appear to be located relative to each other and relative to nearby land masses in a distorted manner which makes instant correlation difficult in terms of a standard PPI display. This difficulty is aggravated under conditions of relatively high speeds inasmuch as less time is available for the navigator to correlate the PPI display with his own actual view of the target deployment. Thus, it becomes desirable to introduce perspective into the target display so that the navigator may readily correlate and identify the radar targets in time sufficient to permit appropriate collision avoidance maneuver. It is important that perspective be introduced in such a way that the previously mentioned advantages of the standard PPI display are not sacrificed.

It is the principal object of the present invention to provide a perspective-type target display wherein straight line target courses are depicted as such.

Another object is to provide a polar coordinate target display in simulated perspective in which straight line target courses are displayed as corresponding straight line indications which can be extrapolated to yield anticipated point of closest approach.

A further object is to provide a perspective-type polar coordinate target display in which the degree of perspective can be changed easily.

These and other objects of the present invention, as will appear from the reading of the following specification, are achieved in the preferred embodiment by the inclusion of a special range sweep circuit in an otherwise conventional radar PPI. In the preferred embodiment, a conventional linear sawtooth voltage is applied to the special range sweep circuit to yield an output voltage for scope range deflection in accordance with the expression $$\rho = \frac{R_a}{1 + \frac{R_a}{M} \cos \theta}$$

wherein $\rho$ = the required output signal for scope range deflection,
$R_a$ = the actual range of the target,
$M$ = a constant of proportionality, and
$\theta$ = the relative bearing of the target.

The signal represented by the factor $\rho$ is applied to the radial beam deflection means of a polar coordinate target display cathode ray tube. The angular deflection and the intensity modulation of the CRT beam are accomplished in accordance with conventional PPI techniques. The result is that the CRT beam is swept radially in a nonlinear rather than the usual linear manner with the curvature of the nonlinear characteristic varying as a function of the deflection angle of the CRT beam. The nonlinear curvature of the range sweep is a maximum for targets dead ahead (0° relative bearing) and degenerates toward a linear range sweep for targets situated on the beam (90° and 270° relative bearing). Thus, targets lying within the dead ahead zone of critical interest to a pilot of a high speed craft such as a hydrofoil are displayed at proper azimuth but nonlinearly compressed range to yield a simulated perspective presentation. Targets appearing to the left and to the right of said zone are displayed with less range distortion and, hence, with less perspective but such targets are of lesser interest. In the preferred embodiment, the target display is off-centered so that own ship is represented at the bottom of the CRT face. This design feature permits the maximum utilization of the CRT display area for those targets which are displayed about the aforementioned zone of interest. Targets at the right and left of said zone, excepting those at relatively short ranges, fall off the face of the CRT tube and are not displayed.

By making the nonlinear curvature of the range sweep a function of azimuth, the following desirable features are achieved:

(1) Target following straight line courses are depicted by straight line representations.

(2) Intercepts of the target ship tracks with own ship track can be predicted by visually extending said straight line representations.

(3) A target on a collision course is depicted by motion along a constant bearing line directed at the display origin.

(4) All targets are displayed at proper bearings.

(5) The range scale is expanded for nearby dead ahead targets so that their relative significance is dramatized to the radar operator-viewer by the magnified size and increased velocity of the target indications.

For a more complete understanding of the present invention, reference should be had to the following specification and to the appended figures of which:

Figure 1:
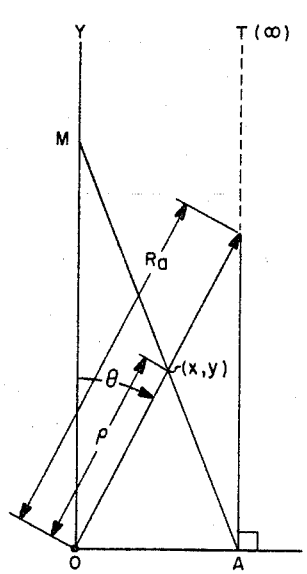
FIG. 1 is a diagram of the perspective geometry on which the present invention is based.

Referring to FIG. 1, own ship is represented by point 0 and is travelling along line OY. A target T is travelling toward own ship along course TA parallel to own ship's course OY. The factors $R_a$ and $\theta$ respectively represent the slant range and the relative bearing of the target at a particular time during its travel along course TA.

It is desired that each true position of the target ship T be transformed to a corresponding position as seen in perspective to an observer at 0. When this is done, the displayed representation of ship T will follow the path MA on the cathode ray tube. Path MA is the course along which target T would appear to be travelling to an observer viewing the actual scene. Point M represents an assumed vanishing point for the perspective display.

The transformation of the target true coordinates ($R_a$, $\theta$) into the desired corresponding perspective coordinates ($\rho$, $\theta$) may be obtained by deriving a polar coordinate expression for line MA. Noting that $A = R_a \sin \theta$, $x = \rho \sin \theta$, and $y = \rho \cos \theta$, and substituting the same in the straight line equation $$\frac{X}{A} + \frac{y}{M} = 1$$

there results the coordinate transformation expression $$\rho = \frac{R_a}{1 + \frac{R_a}{M} \cos \theta}$$

It can be shown that the coordinate transformation expression always defines a straight line in terms of the perspective coordinates, $\rho$, $\theta$ as long as the true motion of the target also is along a straight line.

Figure 2:
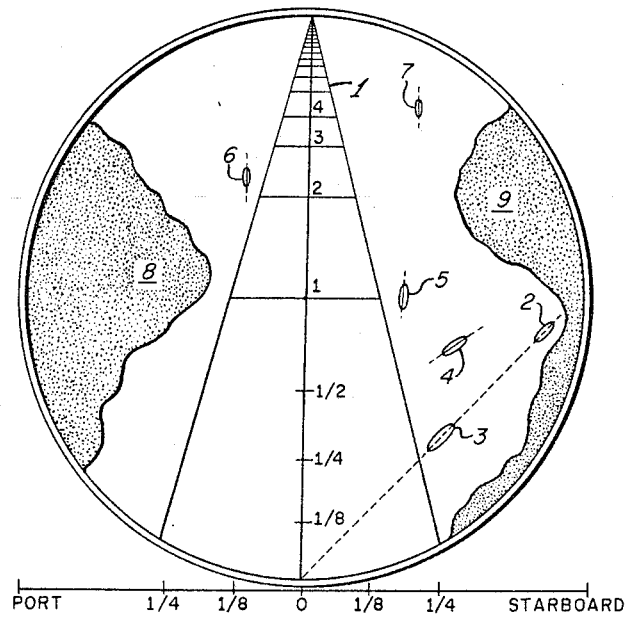
FIG. 2 is a representation of a typical target display provided by the present invention.

FIG. 2 represents a typical display of target resulting from the transformation of target actual coordinates into target perspective coordinates in accordance with the above derived expression. The origin, 0, is at the bottom of the display. A calibrated perspective graticule 1 is superimposed upon the display and extends from the origin 0 to infinite range ahead and to short range to port and starboard. It will be observed that the graticule simulates a perspective view of a "highway" along which own ship is travelling.

Assuming that a radar is employed having a sufficiently high azimuth scanning rate and that long persistance phosphors are used on the CRT face, the displayed moving targets are manifested by luminous spots whose lengths vary with the target range and with the target relative bearing. The visual impact is maximized for targets at short ranges because of the range scale magnification resulting from the nonlinear character of the range sweep. For example, target returns 2 and 3 represent two successive positions of an incoming target moving along a straight line collision course with own ship. It will be noted that the target representation at position 2 is smaller than the representation at position 3 as a result of the nonlinear character of the range sweep. It should be observed also that concomitant with the increased size of the target representation there is also an increase in the apparent velocity of the target representation as it approaches the position of own ship. Thus, the target representation is given an exaggerated size and motion as it approaches the position of own ship where its collision potentiality is more imminent.

Additional representative target displays 4, 5, 6 and 7 also are shown in FIG. 2 along with land masses 8 and 9. The dashed lines adjacent each of the target returns represents the respective course being followed. Generally speaking, the shorter the range for a given target bearing, the larger the target representation will be, and the larger the bearing angle for a given target range, the larger the target representation will be. Thus, target return 3 is larger than return 2. Target return 5 is somewhat smaller than target return 4 because of the smaller bearing angle and longer range of the former. Target return 7 is smaller than return 6 because the greater relative bearing angle of the former does not offset the effect of its greater range. It should also be observed that the same nonlinear range sweep which gives rise to the magnification of the target indications at short range also causes the velocities of the targets to be increased in the display. The larger the size of the indication resulting from a given target position, the faster the indication will move on the face of the cathode ray tube for a given target speed.

Figure 3:
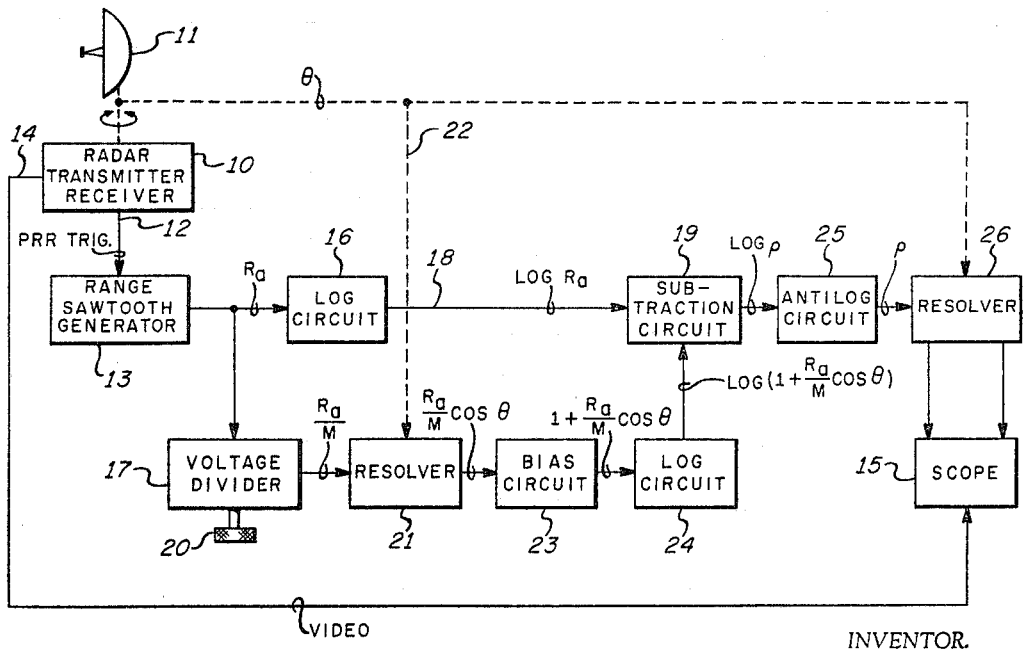
FIG. 3 is a simplified block diagram of a preferred embodiment of the invention.

The computation required by the expression for the transformation of target actual coordinates into target perspective coordinates can be achieved with the aid of conventional analog computer components. A representation computer instrumentation is represented in the block diagram of FIG. 3. Conventional radar transmitter-receiver 10 provides pulses of microwave energy which are radiated by azimuthally scanning directional antenna 11. Radar 10 also provides pulse repetition rate triggers on line 12 for the actuation of range sawtooth generator 13 and target echo video signals on line 14 for the intensity modulation of the cathode ray beam of scope 15. The range sawtooth signal generated in response to each trigger from radar 10 is applied jointly to logarithmic circuit 16 and voltage divider 17. Circuit 16 has a logarithmic transfer characteristic such as discussed in Section 19.4 of Waveforms, volume 19, MIT Radiation Laboratory Series, McGraw-Hill, 1949. A signal representing the logarithm of the range sawtooth is applied via line 18 to subtraction circuit 19.

Voltage divider 17 preferably is a simple potentiometer which is excited by the range sawtooth. The position of the potentiometer slider at which the output signal is developed is controlled by knob 20 in accordance with the factor M representing the varnishing point in FIG. 1. The amount of the perspective produced in the target display can be varied by adjustment of the value of the factor M via knob 20. The output signal from divider 17 representing the quotient $R_a/M$ is applied to resolver 21 whose rotor is positioned synchronously with the azimuth rotation of antenna 11 by means of shaft 22. The resolver functions in a conventional manner to multiply the quotient $R_a/M$ by the cosine of the azimuth angle $\theta$ derived from shaft 22 and applies the product to bias circuit 23. Circuit 23 adds a fixed factor of unity (a D.C. voltage level) to the product $R_a/M \cos \theta$ and applies the sum $$\left(1 + \frac{R_a}{M} \cos \theta\right)$$

to logarithmic circuit 24. Circuit 24, like circuit 16, has a logarithmic transfer characteristic and produces an output signal representing the factor log $$\left(1 + \frac{R_a}{M} \cos \theta\right)$$

for application to subtraction circuit 19. In accordance with the previously derived expression $$\rho = \frac{R_a}{1 + \frac{R_a}{M} \cos \theta}$$

and its equivalent form log $$\rho = \log R_a - \log \left(1 + \frac{R_a}{M} \cos \theta\right),$$

the output signal provided by circuit 19 represents the factor log $\rho$. The antilogarithm of the signal representing log $\rho$ is produced by antilogarithmic circuit 25. As discussed in the cited Radiation Laboratory text, the antilogarithmic circuit may be a circuit device having an exponential transfer characteristic directly representing the antilogarithm or the antilogarithmic circuit may be comprised of a logarithmic circuit employed in the feedback loop of an operational circuit. Circuit devices having a suitable exponential (antilogarithmic) transfer function include certain pentodes having a screen driven by a current source. The signal representing a factor $\rho$ at the output of circuit 25 is transformed into equivalent rectangular coordinate signals by resolver 26 which is also driven synchronously with the azimuth scanning of antenna 11. The two output signals from resolver 26 representing, respectively, $\rho \sin \theta$ and $\rho \cosine \theta$ are applied to the orthoganal deflection means of electrostatically deflected scope 15.

From the preceding specification it can be seen that the objects of the present invention have been achieved through the provision of a special sweep deflection circuit for use in a polar coordinate radar target display system wherein the range sweep is distorted to have a nonlinear characteristic which varies as a function of target azimuth angle. The range sweep is maximally nonlinear at 0° relative bearing angle and degenerates to a purely linear sawtooth at 90° and 270° relative bearings. The result is that the target display closely simulates true perspective within the critical zone about 0° relative bearing while retaining the desirable feature of a standard PPI display whereby targets following straight line courses are displayed in like manner. In addition, visual emphasis is given to those targets of primary interest to the pilot of the protected craft. The visual emphasis is achieved by imparting a size and a velocity to the displayed target representations inversely in accordance with target range. The shorter the range to the target ahead, the larger the size and the faster the motion of the displayed target representation.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:
1. A target display system comprising
   means for producing first and second signals representing the range and the bearing angle, respectively, of a target and further producing a range timing signal,
   target indicator means connected to receive said first and second signals,
   and a sweep circuit connected to receive said second signal and said range timing signal for providing a recurrent sweep signal having a characteristic varying nonlinearly with target range, the curvature of said nonlinear characteristic varying as a function of said second signal,
   said sweep signal being applied to said indicator means.
2. A target display system comprising
   means for producing first and second signals representing the range and the bearing angle, respectively, of a target and further producing a range timing signal,
   target indicator means connected to receive said first and second signals,
   and a sweep circuit connected to receive said second signal and said range timing signal for providing a recurrent sweep signal in accordance with the expression
   $$\rho = \frac{R_a}{1+\frac{R_a}{M} \cos \theta}$$
   wherein $\rho$ represents said sweep signal, $R_a$ represents the range to said target, $M$ represents a constant of proportionality and $\theta$ represents the bearing angle of said traget,
   said sweep signal being applied to said indicator means.
3. A radar target display system comprising
   azimuthally scanning pulsed radar means for producing an echo signal representing the range to a target, pulse repetition rate triggers for measuring said range to said target, and a scanning angle signal representing the bearing angle of said target,
   target indicator means connected to receive said echo signal and said scanning angle signal,
   and a sweep circuit connected to receive said pulse repetition rate triggers and said scanning angle signal for providing a sweep signal having a characteristic varying nonlinearly with target range, the curvature of said nonlinear characteristic varying as a function of said scanning angle signal,
   said sweep signal being applied to said indicator means.
4. A radar target display system comprising
   azimuthally scanning pulsed radar means for producing an echo signal representing the range to a target, pulse repetition rate triggers for measuring said range to said target, and a scanning angle signal representing the bearing angle of said target,
   a polar coordinate cathode ray tube target indicator means having first means for radially deflecting the beam of said tube, second means for angularly deflecting said beam, and third means for intensifying said beam,
   said scanning angle signal being applied to said second means and said echo signals being applied to said third means,
   and a sweep circuit connected to receive said pulse repetition rate triggers and said scanning angle signal for producing a sweep signal having a characteristic varying nonlinearly with target range, the curvature of said nonlinear characteristic varying as a function of said scanning angle signal,
   said sweep signal being applied to said indicator means.
5. A radar target display system comprising
   azimuthally scanning pulsed radar means for producing an echo signal representing the range to a target, pulse repetition rate triggers for determining the range to said target, and a scanning angle signal representing the bearing angle of said target,
   a polar coordinate cathode ray tube target indicator means having first means for radially deflecting the beam of said tube, second means for angularly deflecting said beam, and third means for intensifying said beam,
   said scanning angle signal being applied to said second means and said echo signals being applied to said third means,
   and a sweep circuit connected to receive said repetition rate triggers and said scanning angle signal for providing a sweep signal in accordance with the expression
   $$\rho = \frac{R_a}{1+\frac{R_a}{M} \cos \theta}$$
   wherein $\rho$ represents said sweep signal, $R_a$ represents the range to said target, $M$ represents a constant of proportionality and $\theta$ represents the bearing angle of said target,
   said sweep signal being applied to said first means.
6. A target display signal as defined in claim 5 wherein said beam of said cathode ray tube is off-centered so that it impinges adjacent the perimeter of the face of said tube.

References Cited by the Examiner
UNITED STATES PATENTS

| | | | |
|---|---|---|---|
| 2,611,126 | 9/1952 | Irving | 343—11 |
| 2,950,475 | 8/1960 | Hance | 343—11 X |
| 3,080,555 | 3/1963 | Vadus et al. | 343—11 X |
| 3,088,110 | 4/1963 | Hunter | 343—11 |
| 3,154,779 | 10/1964 | Kenny | 343—11 |

CHESTER L. JUSTUS, *Primary Examiner.*

P. M. HINDERSTEIN, *Assistant Examiner.*